US007900042B2

(12) United States Patent
Hall et al.

(10) Patent No.: US 7,900,042 B2
(45) Date of Patent: Mar. 1, 2011

(54) ENCRYPTED PACKET INSPECTION

(75) Inventors: Rick Hall, Austin, TX (US); Oscar R. Mitchell, Pflugerville, TX (US)

(73) Assignee: nCipher Corporation Limited, Stoneham, MA (US)

( * ) Notice: Subject to any disclaimer, the term of this patent is extended or adjusted under 35 U.S.C. 154(b) by 1748 days.

(21) Appl. No.: 10/165,426

(22) Filed: Jun. 7, 2002

(65) Prior Publication Data

US 2003/0018891 A1 Jan. 23, 2003

Related U.S. Application Data

(60) Provisional application No. 60/300,955, filed on Jun. 26, 2001, provisional application No. 60/326,266, filed on Oct. 1, 2001, provisional application No. 60/357,243, filed on Feb. 15, 2002.

(51) Int. Cl.
*H04L 29/06* (2006.01)
*G06F 11/00* (2006.01)
*H04N 7/16* (2006.01)

(52) U.S. Cl. ............. 713/160; 713/153; 726/22; 726/23; 726/24; 726/25; 726/26

(58) Field of Classification Search .................... 726/23; 713/160
See application file for complete search history.

(56) References Cited

U.S. PATENT DOCUMENTS

| | | | | |
|---|---|---|---|---|
| 5,557,678 A | * | 9/1996 | Ganesan | 380/282 |
| 5,920,630 A | * | 7/1999 | Wertheimer et al. | 380/286 |
| 6,240,514 B1 | * | 5/2001 | Inoue et al. | 713/153 |
| 6,636,838 B1 | * | 10/2003 | Perlman et al. | 705/51 |
| 6,643,701 B1 | * | 11/2003 | Aziz et al. | 709/227 |
| 6,772,333 B1 | * | 8/2004 | Brendel | 713/153 |
| 7,055,027 B1 | * | 5/2006 | Gunter et al. | 713/151 |
| 7,058,973 B1 | * | 6/2006 | Sultan | 726/12 |
| 7,340,499 B1 | * | 3/2008 | Casella | 709/201 |
| 2002/0004902 A1 | * | 1/2002 | Toh et al. | 713/170 |
| 2002/0007453 A1 | * | 1/2002 | Nemovicher | 713/155 |
| 2002/0069356 A1 | * | 6/2002 | Kim | 713/160 |
| 2002/0107962 A1 | * | 8/2002 | Richter et al. | 709/225 |
| 2002/0116606 A1 | * | 8/2002 | Gehring | 713/153 |
| 2002/0129237 A1 | * | 9/2002 | Radatti et al. | 713/153 |

OTHER PUBLICATIONS

Menezes, A.J., et al "Handbook of Applied Cryptography" Boca Raton, CRC Press, 1997.

* cited by examiner

*Primary Examiner* — William R Korzuch
*Assistant Examiner* — Trang Doan
(74) *Attorney, Agent, or Firm* — John A. Fortkort; Fortkort & Houston P.C.

(57) ABSTRACT

A method, system, and device for encrypted packet inspection allowing an authorized third party device to monitor cryptographic handshaking information (full- duplex) between two other devices and together with the secret private key then transparently decrypt the bulk encrypted data stream.

The scope of this invention encompasses many applications, three examples of which are firewalls, load balancers, and local network caches. Additionally, this invention achieves and contributes to the efficient handling of encrypted information in other ways, three examples of which are making switching, routing, and security decisions.

85 Claims, 3 Drawing Sheets

ENCRYPTED PACKET INSPECTION

CROSS-REFERENCE TO RELATED APPLICATIONS

This application claims the benefit of the following U.S. Provisional Applications, all of which are hereby incorporated by reference:

COMMONLY OWNED AND PREVIOUSLY FILED U.S. PROVISIONAL PATENT APPLICATIONS

| Atty. Dkt. # | Ser. No. | Title | Filing Date |
| --- | --- | --- | --- |
| 501143.000011 | 60/300,955 | Add-Drop Layer 3 Ethernet Ring Switch | Jun. 26, 2001 |
| 501431.000014 | 60/326,266 | Application Specific Information Processing System | Oct. 1, 2001 |
| 501143.000026 | 60/357,243 | Encrypted Packet Inspection | Feb. 15, 2002 |

The current application may share some specification and figures with the following commonly owned and previously filed application, which is hereby incorporated by reference:

COMMONLY OWNED AND PREVIOUSLY FILED U.S. NONPROVISIONAL PATENT APPLICATIONS

| Atty. Dkt. # | Ser. No. | Title | Filing Date |
| --- | --- | --- | --- |
| 501143.000019 | 10/068,295 | Application-Specific Information-Processing Method, System, and Apparatus | Feb. 5, 2002 |

The benefit of 35 U.S.C. §120 is claimed to the maximum extent allowable by law for all of the above referenced commonly owned applications. The contents of the applications referenced in the tables above are not necessarily identical to the contents of this application.

All references cited hereafter are incorporated by reference to the maximum extent allowable by law. To the extent a reference may not be fully incorporated herein, it is incorporated by reference for background purposes and indicative of the knowledge of one of ordinary skill in the art.

BACKGROUND OF THE INVENTION

1. Field of the Invention

The present invention relates generally to cryptography and in particular to networking cryptography.

2. Description of Related Art

SSL/TLS is the de facto method of encrypting information over the public Internet, particularly for e-commerce applications. SSL/TLS is a protocol that operates between Layer 4 (called the Transport Layer) and Layer 5 (called the Session Layer) of the OSI protocol stack. Typically, the Layer 4 protocol used for SSL/TLS is TCP while protocol for Layer 5-7 (sometimes referred to as the Application Layer as an aggregate layer) is HTTPS (secured).

SSL/TLS basically encrypts the Application Layer information which commonly is HTTPS data which might contain sensitive financial records or passwords or credit card numbers for purchasing products from an e-commerce website. The benefit to consumers of using SSL/TLS is that their financial transactions are secured to a very high degree over the public Internet. Today, the most common key size of 1,024 bits is thought to be unbreakable for at least 5-10 years by some estimates. SSL/TLS is supported in almost all major web browsers such as MS Explorer and Netscape Navigator.

BRIEF SUMMARY OF THE INVENTION

This invention includes a method, system, and device for encrypted packet inspection allowing an authorized third party device to monitor cryptographic handshaking information (full-duplex) between two other devices and together with the secret-private key then transparently decrypt the bulk encrypted data stream.

The scope of this invention encompasses many applications, three examples of which are firewalls, load balancers, and local network caches. Additionally, this invention achieves and contributes to the efficient handling of encrypted information in other ways, three examples of which are making switching, routing, and security decisions.

BRIEF DESCRIPTION OF THE DRAWINGS

The following drawings form part of the present specification and are included to further demonstrate certain aspects of the present invention. The figures are not necessarily drawn to scale. The invention may be better understood by reference to one or more of these drawings in combination with the detailed description of specific embodiments presented herein.

DETAILED DESCRIPTION OF PREFERRED EMBODIMENTS

E-commerce infrastructures today use switches, caches and firewalls which feature "deep packet inspection", a term that usually means that the information at Layers 5-7 is examined for making switching, routing or security decisions. As an example, some website switches recognize URL information in order to switch users to specific servers. Another example is reading a user's "cookie" to allow that person to access the same server (sometimes called "stickiness").

However, SSL/TLS traffic presents a significant obstacle to website infrastructure equipment since it encrypts all Layer 5-7 data. Thus a load balancer cannot decipher a user's cookie in an SSL/TLS-encrypted session without using decryption in order to switch that user to the best server for his application. Firewalls typically cannot implement URL blocking of SSL/TLS traffic and usually passes such data through without any filtering or intrusion detection. Caches cannot determine if an SSL/TLS encrypted HTML object or web page is a hit or not without using decryption.

IT managers can alleviate this problem by terminating SSL/TLS sessions at the edge of their network and then routing plaintext traffic throughout the rest of their infrastructure. However, this is not always feasible since SSL/TLS for security purposes is usually terminated close to the server farm. Most network edge architectures use a router and firewall and Layer 2/3 switch before SSL/TLS can be terminated. In some cases, SSL/TLS sessions are terminated right at each server via an add-in SSL/TLS accelerator card that maintains the end-to-end security of the session (i.e., from the client at his home to the server in the e-commerce site). Hence, there are many reasons why terminating SSL/TLS early (i.e. before most of the equipment using Layer 5-7 information) at the network edge may not feasible or desirable.

Figure 1:
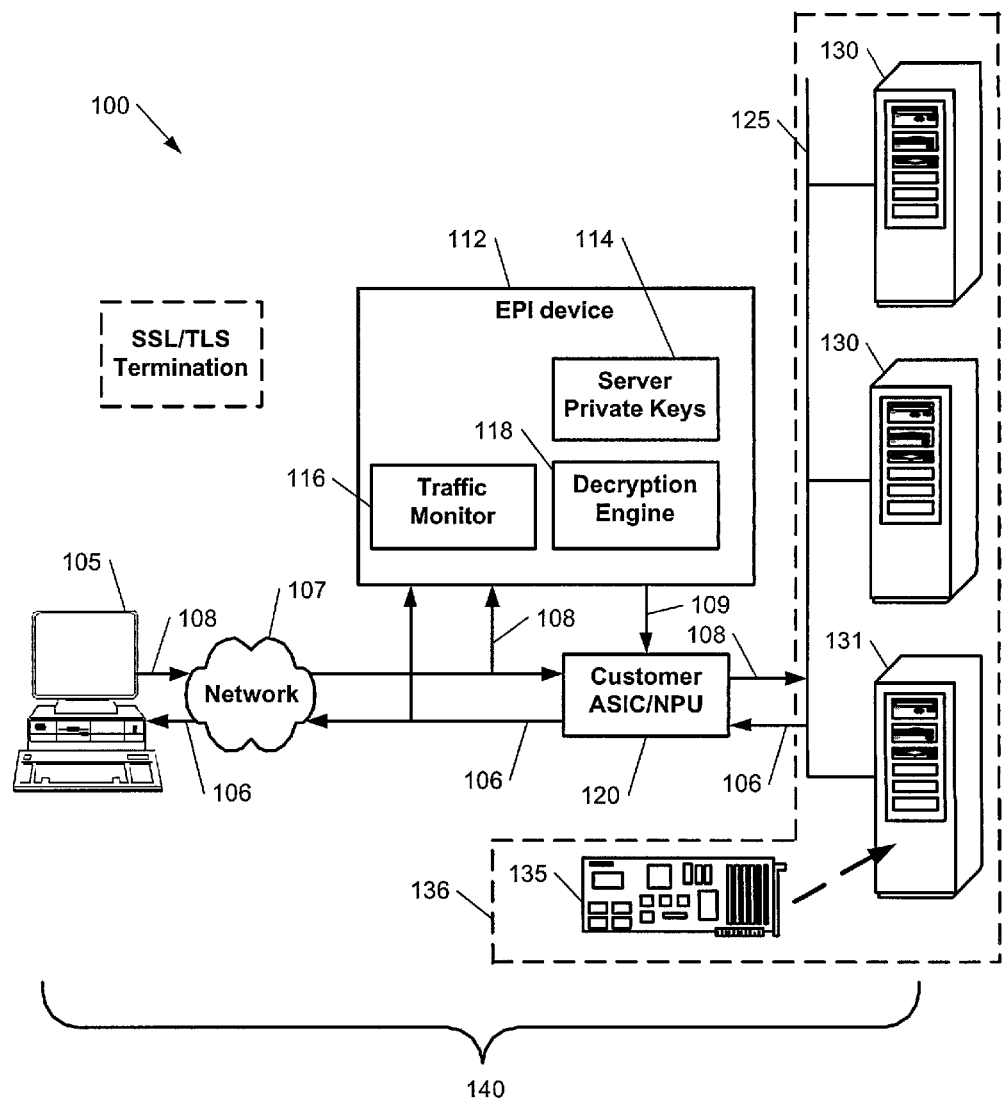
FIG. 1 shows an encrypted packet inspection (EPI) device monitoring one cryptographic session, in accordance with an embodiment of the present invention.

Referring to an embodiment illustrated in FIG. 1, a server 131 is connected to a server-farm network 125 for servers 130. The server 131 terminates an SSL/TLS connection 140 using an SSL/TLS accelerator card 135. This is only one possible implementation providing the SSL/TLS termination 136 necessary in the embodiment. An encrypted-packet-inspection-enabled architecture 100 allows multiple devices in a data center or enterprise infrastructure to passively and non-invasively monitor the encrypted traffic of an SSL/TLS session 140. An EPI device would monitor all SSL/TLS sessions 140 as directed by the host and offer up decrypted, plaintext data 109 upon demand or as streaming data. In addition, the EPI device 112 would allow equipment such as local network caches to cache SSL/TLS-protected web pages and objects. In all of these applications the end-to-end nature of SSL/TLS session 140 is preserved including the public key negotiation, MD-5 or SHA-1 authentication, and symmetric bulk encryption. The client 105 and server 131 are unaware of the monitoring occurring by a box 112 in the middle of the connection.

In order for the EPI device 112 to work, it must be loaded with the same set of private certificate keys 114 that the server 131 uses. Once an EPI device 112 has the private certificate keys 114, its traffic monitor 116 can then monitor the initial key exchange of an SSL/TLS handshake and then determine the resulting symmetric keys used for bulk encryption. Note that the EPI device 112 does not interfere with the handshaking at all; it only begins to deliver decrypted information 109 from its decryption engine 118 to the host 120 once bulk encryption is being used for data transfer. Thus, a completely separate device 112 can monitor all the SSL/TLS handshaking information (full-duplex) and together with the secret private key then transparently decrypt the bulk encrypted data stream in either direction.

Device 120 is shown in the detailed descriptions of these embodiments as a Customer Application Specific Integrated Circuit or Network Processing Unit (ASIC/NPU) for purpose of example. But device 120 can be any system application circuitry without departing from the scope of the claimed invention. Examples of implementations of device 120 are any processor, ASIC, FPGA, NPC, CPU, memory, RISC, any collection of other processors (even networked devices), etc. For clarity, any customer provided circuitry could be included within the meaning of system application circuitry — here discussed using the example of ASIC/NPU 120.

The SSL/TLS session 140 includes data 106 sent from the server 131 to the client 105 and also data 108 sent from the client 105 to the server 131. In FIG. 1, the client 105 is shown as being connected to the server 131 by a network 107, but that is not a requirement.

Note that servers 130 and network 125 are not relevant to the scope of the invention, but are present for illustrative purposes only. Similarly, the specific device terminating the server end of the SSL/TLS connection does not need to be a device like SSL/TLS accelerator card 135. Rather, the terminating device 136 can be anything capable of terminating an SSL/TLS session. Examples of 136 are hardware termination, software termination, third-party external termination, etc.

Other embodiments utilize encryption other than SSL/TLS without departing from the scope of this invention. An example would be an embodiment that employs the IPSec security protocol and its associated encryption methods to secure network data.

Figure 2:
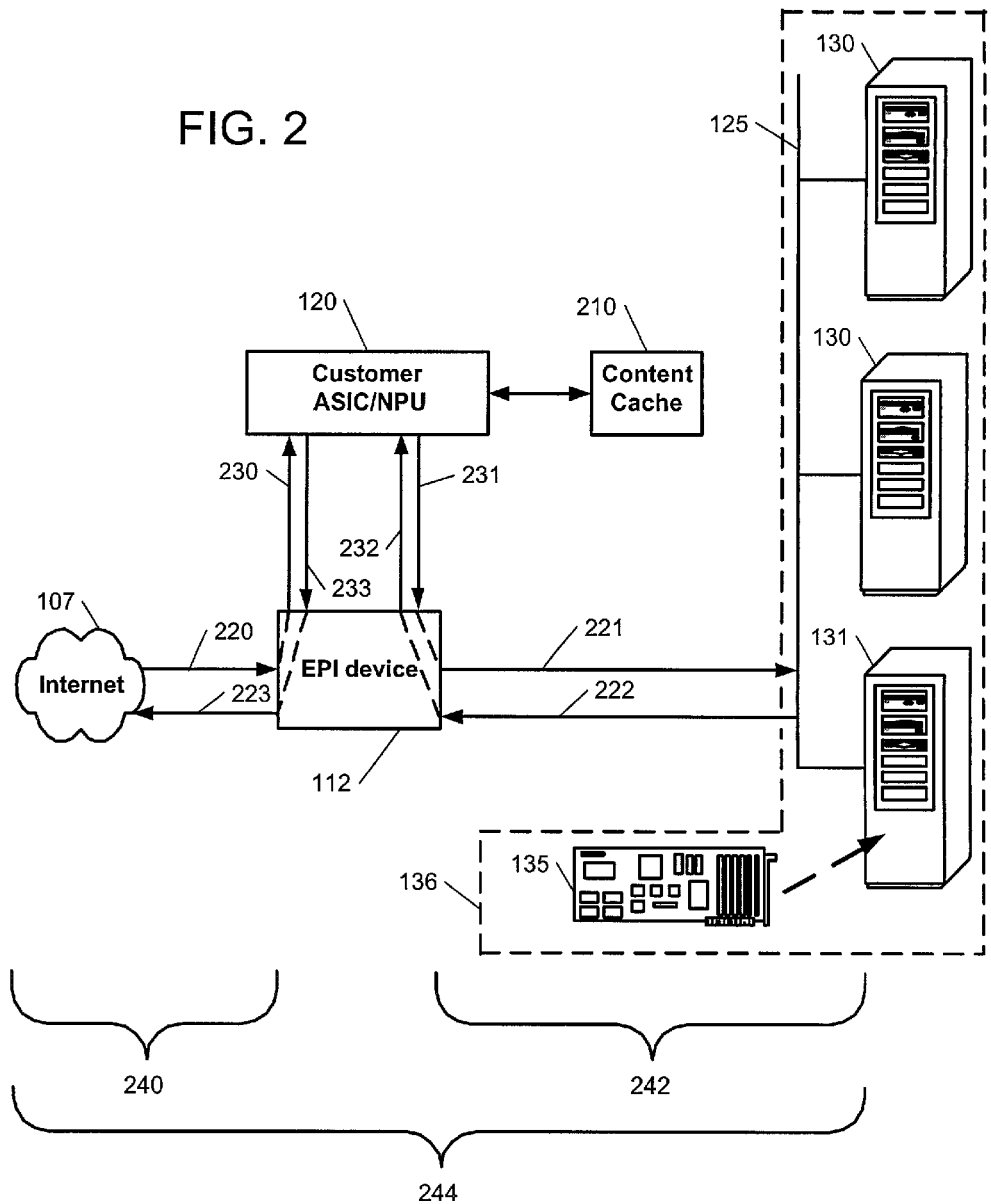
FIG. 2 shows an EPI device terminating two cryptographic sessions, in accordance with an embodiment of the present invention.

Referring to FIG. 2, the EPI device 112 intermediates. That is, it maintains an SSL/TLS session 240 with the client (not shown) and an SSL/TLS session 242 with the server 131. The sessions 240 and 242 are maintained such that the client and the server 131 are not aware of the EPI device's participation in their communication. As in the FIG. 1 embodiment, the server 131 terminates its SSL/TLS session with the SSL/TLS accelerator card 135. This is only one possible implementation providing the SSL/TLS termination 136 necessary in this embodiment. Also, the server 131 is connected to a server farm network 125 having servers 130.

An additional mode that the EPI device 112 supports is network caching data insertion. Basically, when the local cache 210 has a hit, as determined by Customer ASIC/NPU 120, it can deliver the web page or object information to the EPI device 112. Note that in this embodiment, the EPI device 112 and the Customer ASIC/NPU 120 exchange plaintext 230, 231, 232, and 233. The Customer ASIC/NPU 120 can merge data from content cache 210 and send that along to the EPI device 112 for encryption. If that data is outgoing to a client in a typical Internet scenario, it could reduce apparent latency and also reducing server 131 loading. The Customer ASIC/NPU 120 may also need to block the HTTP request to the server 131 and consequently may alter the cleartext traffic 231 fed to the EPI device for this purpose. But one of the caveats of SSL/TLS encryption is that the symmetric keys used for bulk encryption change dynamically based on the information in the previous SSL/TLS record. Therefore, to keep endpoints of the SSL/TLS connection 244 in sync, the EPI device would keep an encryption state table in which client and server symmetric bulk encryption keys for each direction are stored. SSL/TLS data 220 from the client would then be decrypted with one key and reencrypted with another key to send the information 221 to the server in sync with the server. Similarly SSL/TLS data 222 from the server would be decrypted with one key and reencrypted with another key to send the information 223 to the client in sync with the client. In FIG. 2 the client (not shown) is connected to the EPI device 112 via the Internet 107, but that is not required.

Figure 3:
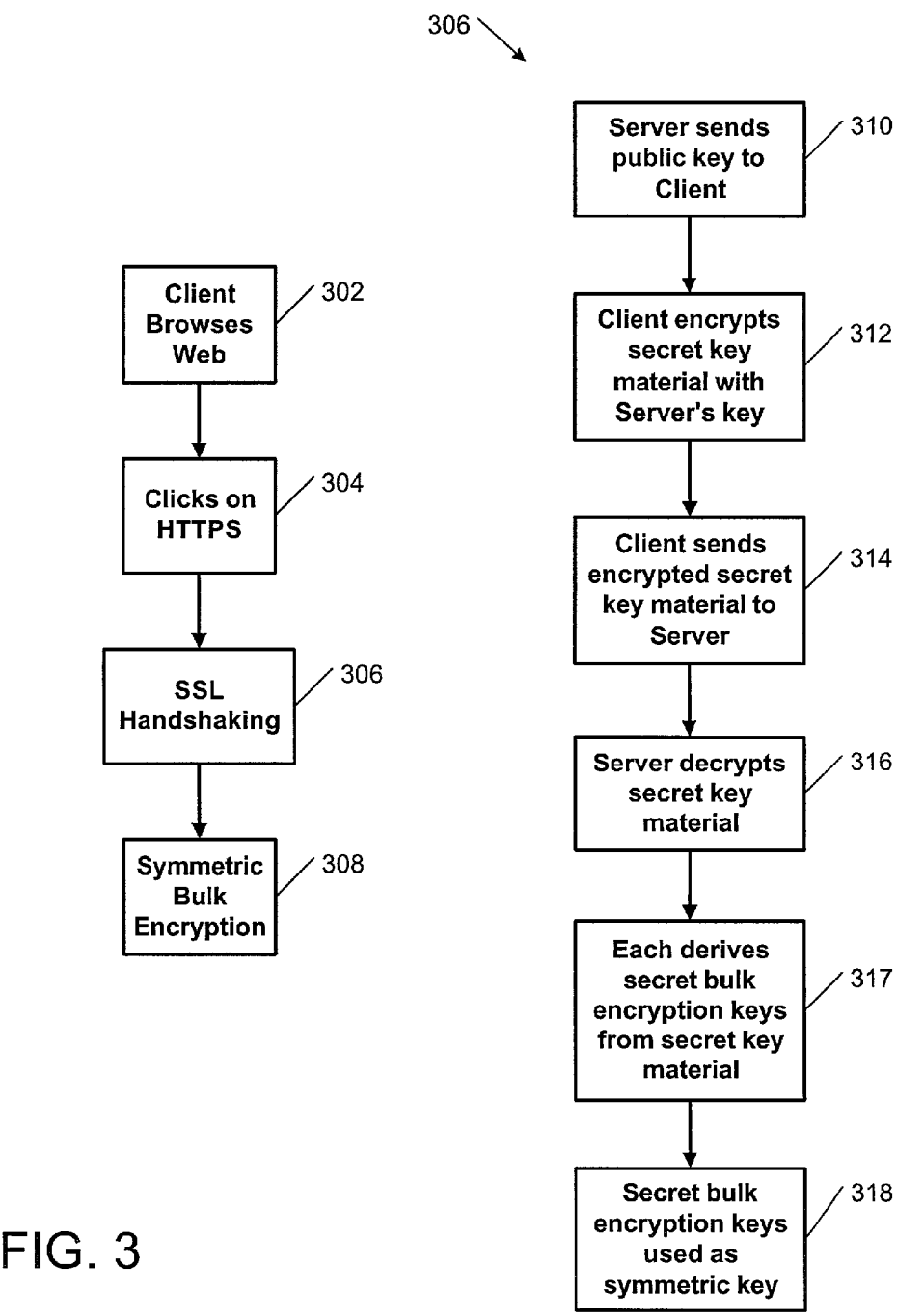
FIG. 3 shows a flowchart of a cryptographic session being established with EPI device monitoring, in accordance with an embodiment of the present invention.

Referring to FIG. 3, an SSL/TLS session is typically initiated by a client (which might be a consumer using his PC at home 302) by clicking on a URL that begins with HTTPS 304. This link might take the client to a secure web page for ordering a product or accessing confidential information such as an on-line bank account. Before the client and server can communicate with symmetric bulk encryption 308, the SSL/TLS handshaking process 306 must be completed. An object of the handshaking is to mutually determine the secret keys that are used in the bulk encryption of data between the client and the server(s) that is providing the web page content. The secret keys are established via public key cryptography that allows the client and the server to share a secret over a non-secure channel (i.e., the World Wide Web).

The SSL/TLS handshaking 306 is shown in more detail in the flowchart breakout 306. In that flowchart breakout 306, the server sends its public key to the client 310; the client then encrypts a parameter called the pre_master_secret (shown in the figure as "secret key material") with the server's public key 312 and then sends that to the server 314. The server in turn decrypts this message with its private key 316. In 317 the server and client each derive a shared secret symmetric key for bulk encryption from the secret key material by calculating an algorithm called the Key Derivation Function (KDF) that expands the pre_master_secret into the master_secret and ultimately into the actual symmetric bulk encryption keys used for the session. Since both the client and server use the same KDF algorithm, their symmetric bulk encryption keys are now implicitly shared between both ends of the connection 318. Any subsequent data transfer between the client and server for this session (such as HTML web page information, credit card numbers, etc) will be encrypted with these secret keys and some negotiated bulk encryption algorithm such as ARC4, Triple DES (3DES) or AES. Today, it is common for ARC4 to be used with a 128-bit key.

A third party observing the SSL/TLS handshaking will not be able to discover the shared secret keys since it does not have access to the private key that the server is using. Trying to factor a private key is extremely difficult and it is estimated that current 1024-bit RSA keys, for example, are safe from hacking for 5-10 years.

An EPI device acts as an authorized third party in that the same private certificate key that the server is using has been loaded into the EPI device. This assumes that the IT manager for a secure website allows private keys to be loaded into devices such as firewalls and other devices within his infrastructure or LAN. With the server's private key in hand, an EPI device can then monitor the full-duplex SSL/TLS handshaking process and finally determine what the secret keys used for the symmetric bulk encryption phase. This involves capturing all SSL/TLS handshaking messages such as "Client Hello", "Server Hello", "Client Key Exchange", etc.

Once the SSL/TLS handshaking is complete, the EPI device provides the host with a decrypted data stream that represents the transmitted plaintext information from the client. The EPI device can also decrypt the transmitted data stream from the server as well, although for most applications the client information is of highest interest.

As mentioned earlier, the operation of an EPI device changes if a local networking cache is used. As cache data is transmitted out to the client (instead as from the server), the 2 ends of the connection will become unsynchronized in terms of the symmetric bulk encryption keys. The EPI device must then translate between the bulk encryption keys that the client is using and the ones that the server is using. Therefore, connection information for the session is created which tracks the 4 bulk encryption keys now needed to keep the client and server oblivious to the presence of the EPI device. Incoming data from the Client is decrypted using its bulk encryption key and then supplied to the host. The filtered data from the host is then re-encrypted using the server's assumed bulk encryption key for this direction of traffic flow and then transmitted on to the server. Data from the server goes through a similar process on its way to the client.

In the case of the caching application, the EPI device must also keep track of the hashing information that is used to authenticate each SSL/TLS record that is transferred.

An embodiment of the present invention implements a firewall. This firewall embodiment can read SSL/TLS data will permit that device to use all of its Layer 5-7 access control and intrusion detection tools.

Another embodiment of the present invention implements a load balancer. Such a load balancer can decrypt cookie and URL information in order to make better load balancing decisions.

Yet another embodiment of the present invention implements a local network cache. These caches can monitor SSL/TLS sessions for content cache hits which is presently impossible with most caching devices today without actually terminating SSL/TLS sessions. One important advantage that can be achieved by some embodiments of the present invention is allowing new content to be transmitted in the middle of the SSL/TLS connection without the client or server being aware of the EPI device's presence.

Some embodiments of this invention operate with SSL/TLS sessions, so SSL/TLS handshaking is described. But other embodiments of this invention operate with other cryptographic protocols.

Some embodiments of the present invention are adapted to operate with packet-based communications protocols. Examples include UDP, TCP, etc. But the claimed invention extends in scope beyond any specific communication protocol.

World Wide Web communications content has been described in detail, such as HTTP content within an SSL/TLS session. But other embodiments of the present invention handle other, possibly very different, communications content. Examples include POP, FTP, etc.

Glossary

"AES" means Advanced Encryption Standard, as described in Federal Information Processing Standard Publication 197, issued by the National Institute of Standards and Technology on Nov. 26, 2001.

"ARC4" means a stream cipher. ARC4 is an abbreviation of Alleged RC4. RC4 is a trademark of RSA Data Security Inc.

"Cryptographic handshaking" means the establishment of a cryptographic session. An example of cryptographic handshaking is SSL/TLS handshaking.

"Cryptographic session" means a communications link in which symmetric key encryption is used after being established with asymmetric key encryption. Examples of cryptographic sessions are an SSL/TLS session, IPSec tunnel, etc.

"Intermediate" means to terminate a first and second connection, transfer incoming information from the first connection as outgoing information to the second connection, and transfer incoming information from the second connection as outgoing information to the first connection.

"Intrusion detection tools" means tools that monitor system and network resources and activities. That information is used to identify possible intrusions.

"Layer 5-7 intrusion detection tools" means intrusion detection tools that are able to monitor system and network resources and activities at OSI Layers 5-7, or equivalent layer(s) in other communications standards.

"Noninvasive monitoring" means receiving packets of a communication transparently so the noninvasive reception and the noninvasive receiver are undetected by either the sender or the intended recipient. The intended recipient receives the monitored packet as if unmonitored.

"OSI" means Open Systems Interconnect, an ISO standard for worldwide communications that defines a networking framework for implementing protocols in seven layers.

"Packet" means any protocol data unit including a header and payload data or their equivalents. For example, TCP segments, IP datagrams, etc.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provision of 35 U.S.C. §112, ¶6.

It should be apparent from the foregoing that an invention having significant advantages has been provided. While the invention is shown in only a few of its forms, it is not just limited to those forms but is susceptible to various changes and modifications without departing from the spirit thereof.

What is claimed is:

1. An encrypted packet inspection (EPI) method, comprising:
    non-invasively receiving an encrypted packet, the packet being sent in a cryptographic session from a first computing device and addressed to a second computing device which uses a set of private keys to decrypt the encrypted packet;
    decrypting the encrypted packet with the same set of private keys used by the second computing device;
    inspecting the packet;
    re-encrypting the packet; and
    forwarding the re-encrypted packet to the second computing device; wherein decrypting the encrypted packet results in a plaintext packet, wherein the EPI monitors a cryptographic handshaking information of the first and second computing devices as an authorized third party to ascertain symmetric keys to be used for bulk encryption, whereby the cryptographic session is created, wherein the cryptographic handshaking is IPSec handshaking, and wherein the cryptographic session is an IPSec session.

2. The method of claim 1, further comprising sending the plaintext packet in response to a request from a third computing device.

3. The method of claim 1, further comprising sending the plaintext packet automatically to a third computing device.

4. The method of claim 1, wherein the receiving, the decrypting, and the monitoring are performed within the context of a firewall.

5. The method of claim 4, further comprising applying layer 5-7 intrusion detection tools to the plaintext.

6. The method of claim 4, further comprising applying URL blocking to the plaintext.

7. The method of claim 4, further comprising applying URL tracking to the plaintext.

8. The method of claim 1, wherein the receiving, the decrypting, and the monitoring are performed within the context of a load balancer.

9. The method of claim 8, further comprising making load balancing decisions based on the plaintext.

10. The method of claim 9, wherein the plaintext includes cookie information.

11. The method of claim 9, wherein the plaintext includes URL information.

12. The method of claim 1, wherein the receiving, decrypting, and the monitoring are performed within the context of a local network caching system.

13. The method of claim 12, further comprising monitoring the cryptographic session for content cache hits without terminating the cryptographic session.

14. The method of claim 1, further comprising transmitting new content in the middle of the cryptographic session without awareness by either the first computing device or the second computing device.

15. The method of claim 1, wherein the cryptographic handshaking is SSL/TLS handshaking and wherein the cryptographic session is a SSL/TLS session.

16. An encrypted packet inspection (EPI) system comprising:
    an EPI device;
    a system application circuitry;
    a first computing device;
    a second computing device;
    wherein the first and second computing devices are configured to establish a cryptographic session and to send and receive encrypted information over the cryptographic session;
    wherein the cryptographic session passes through the system application circuitry;
    wherein the EPI device is configured to receive communications of the cryptographic session;
    wherein the EPI device is configured to decrypt encrypted communications of the cryptographic session, producing plaintext; and
    wherein the EPI device sends the plaintext to the system application circuitry;
    wherein the first and second computing devices utilize bulk encryption for data transfer between them subsequent to a handshaking protocol, and wherein the EPI device does not produce plaintext until bulk encryption is being used for data transfer between the first and second computing devices, wherein the cryptographic session includes an SSL/TLS session.

17. The system of claim 16, wherein the EPI device operates within a firewall.

18. The system of claim 16, wherein the EPI device operates within a load balancer.

19. The system of claim 16, wherein the EPI device operates within a local network caching system.

20. An encrypted packet inspection (EPI) system comprising:
    a first computing device;
    a second computing device;
    an EPI device;
    a system application circuitry including a content cache configured to provide cache inserted content;
    a table configured to hold private keys of the first and second computing device;
    wherein the first computing device and the second computing device are configured to establish a cryptographic session;
    wherein the EPI device is configured to intermediate the cryptographic session;
    wherein the EPI device is configured to decrypt encrypted packets communicated in the cryptographic session, producing plaintext;
    wherein the EPI device is configured to send the plaintext to the system application circuitry; and
    wherein the system application circuitry is configured to send the plaintext and cache inserted text to the EPI device;
    wherein the EPI device is configured to access the table to decrypt incoming packets with the appropriate private key to stay in sync; and wherein the EPI device is further configured to encrypt outgoing packets with the appropriate private key to stay in sync.

21. The system of claim 20, wherein the EPI device operates within a firewall.

22. The system of claim 20, wherein the EPI device operates within a load balancer.

23. The system of claim 20, wherein the EPI device operates within a local network caching system.

24. The system of claim 20, wherein the cryptographic session includes an SSL/TLS session.

25. The method of claim 1, wherein the encrypted packet is sent in a SSL/TLS cryptographic session from the first computing device to the second computing device.

26. The method of claim 25, wherein the first and second computing devices utilize a symmetric bulk encryption algorithm in communications between them, and wherein the EPI device is adapted to translate between the bulk encryption keys used by the first and second computing devices so that communications between the first and second computing devices remain synchronized.

27. The method of claim 1, wherein the encrypted packet is received by an authorized third party.

28. An encrypted packet inspection (EPI) method, comprising:
   providing an EPI device configured to maintain a first SSL/TLS session with a first computing device and a second SSL/TLS session with a second computing device;
   non-invasively receiving an encrypted packet from the first computing device during the first SSL/TLS session, the packet being addressed to the second computing device;
   decrypting the encrypted packet with the same set of private keys used by the second computing device, thereby producing a decrypted package;
   inspecting the decrypted packet;
   re-encrypting the decrypted packet; and
   transmitting the re-encrypted packet to the second computing device;
   wherein the first and second SSL/TLS sessions form a communications link between the first and second computing devices, wherein the first and second computing devices utilize a symmetric bulk encryption algorithm in communications between them over the communications link, and wherein the EPI device is adapted to translate between the bulk encryption keys used by the first and second computing devices so that communications between the first and second computing devices over the communications link remain synchronized.

29. The method of claim 28, wherein the first computing device is a client, and wherein the second computing device is a server.

30. The method of claim 28, wherein the step of decrypting the encrypted packet with the same set of private keys used by the second computing device results in a plaintext packet.

31. The method of claim 28, wherein the step of inspecting the decrypted packet implements a firewall.

32. The method of claim 28, wherein the step of inspecting the decrypted packet implements a load balancer.

33. The method of claim 28, wherein the step of inspecting the decrypted packet implements a local network cache.

34. The method of claim 16, wherein the first and second computing devices engage in a handshaking protocol as part of the cryptographic session, and wherein the EPI device does not interfere with the handshaking protocol.

35. The method of claim 1, wherein the first and second computing devices engage in a handshaking protocol as part of the cryptographic session, and wherein the encrypted packet is received without interfering with the handshaking protocol.

36. The method of claim 1, wherein re-encrypting the packet involves re-encrypting the packet with symmetric bulk encryption keys obtained by passively monitoring a handshake protocol conducted between the first and second computing devices.

37. The method of claim 34, wherein the EPI device and server are both located at an SSL/TLS termination.

38. The method of claim 1, further comprising applying layer 5-7 intrusion detection tools to the decrypted packet, and wherein the encrypted packet is received as part of an SSL/TLS-encrypted session.

39. The method of claim 28, wherein the EPI device maintains a first SSL/TLS session with the first computing device and a second SSL/TLS session with the second computing device, wherein the EPI device receives the encrypted packet from the first computing device during the first SSL/TLS session, and wherein the EPI device transmits the encrypted packet to the second computing device during the second SSL/TLS session.

40. The method of claim 1, wherein non-invasively receiving an encrypted packet involves receiving the encrypted packet in such a way that the reception is undetected by the first or second computing device.

41. An encrypted packet inspection (EPI) method, comprising:
   non-invasively receiving an encrypted packet, the packet being sent as part of an SSL/TLS-encrypted session from a first computing device and addressed to a second computing device which uses a set of private keys to decrypt the encrypted packet;
   decrypting the encrypted packet with the same set of private keys used by the second computing device;
   applying layer 5-7 intrusion detection tools to the decrypted packet;
   re-encrypting the packet; and
   forwarding the re-encrypted packet to the second computing device;
   wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and wherein the receiving, the decrypting, and the monitoring are performed within the context of a firewall.

42. The method of claim 41, wherein decrypting the packet results in a plaintext packet, and further comprising sending the plaintext packet in response to a request from a third computing device.

43. The method of claim 41, wherein decrypting the packet results in a plaintext packet, and further comprising sending the plaintext packet automatically to a third computing device.

44. The method of claim 41, further comprising applying layer 5-7 intrusion detection tools to the plaintext.

45. The method of claim 41, further comprising applying URL blocking to the plaintext.

46. The method of claim 41, further comprising applying URL tracking to the plaintext.

47. The method of claim 41, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, wherein the receiving, the decrypting, and the monitoring are performed within the context of a load balancer.

48. The method of claim 47, wherein decrypting the packet results in a plaintext packet, and further comprising making load balancing decisions based on the plaintext.

49. The method of claim 48, wherein the plaintext includes cookie information.

50. The method of claim 48, wherein the plaintext includes URL information.

51. The method of claim 41, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and wherein the receiving, the decrypting, and the monitoring are performed within the context of a local network caching system.

52. The method of claim 51, further comprising monitoring the cryptographic session for content cache hits without terminating the cryptographic session.

53. The method of claim 41, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and further comprising transmitting new content in the middle of the cryptographic session without awareness by either the first computing device or the second computing device.

54. The method of claim 41, wherein the cryptographic handshaking is SSL/TLS handshaking and wherein the cryptographic session is a SSL/TLS session.

55. The method of claim 41, wherein the cryptographic handshaking is IPSec handshaking and wherein the cryptographic session is an IPSec session.

56. The method of claim 41, wherein the encrypted packet is received by an authorized third party, and wherein decrypting the encrypted packet results in a plaintext packet.

57. The method of claim 41, wherein the first and second computing devices engage in a handshaking protocol as part of the cryptographic session, and wherein the encrypted packet is received without interfering with the handshaking protocol.

58. The method of claim 41, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and wherein re-encrypting the packet involves re-encrypting the packet with symmetric bulk encryption keys obtained by passively monitoring a handshake protocol conducted between the first and second computing devices.

59. The method of claim 41, further comprising applying layer 5-7 intrusion detection tools to the decrypted packet, and wherein the encrypted packet is received as part of an SSL/TLS-encrypted session.

60. The method of claim 41, wherein non-invasively receiving an encrypted packet involves receiving the encrypted packet in such a way that the reception is undetected by the first or second computing device.

61. An encrypted packet inspection (EPI) method, comprising:
non-invasively receiving an encrypted packet, the packet being sent in a SSL/TLS cryptographic session from a first computing device and addressed to a second computing device which uses a set of private keys to decrypt the encrypted packet;
decrypting the encrypted packet with the same set of private keys used by the second computing device;
inspecting the packet;
re-encrypting the packet; and
forwarding the re-encrypted packet to the second computing device;
wherein the first and second computing devices utilize a symmetric bulk encryption algorithm in communications between them, and wherein the EPI device is adapted to translate between the bulk encryption keys used by the first and second computing devices so that communications between the first and second computing devices remain synchronized.

62. The method of claim 61, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created.

63. The method of claim 61, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and wherein the receiving, the decrypting, and the monitoring are performed within the context of a firewall.

64. The method of claim 61, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, wherein the receiving, the decrypting, and the monitoring are performed within the context of a load balancer.

65. The method of claim 61, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and wherein the receiving, the decrypting, and the monitoring are performed within the context of a local network caching system.

66. The method of claim 65, further comprising monitoring the cryptographic session for content cache hits without terminating the cryptographic session.

67. The method of claim 61, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and further comprising transmitting new content in the middle of the cryptographic session without awareness by either the first computing device or the second computing device.

68. The method of claim 61, wherein the encrypted packet is received by an authorized third party, and wherein decrypting the encrypted packet results in a plaintext packet.

69. The method of claim 61, wherein the first and second computing devices engage in a handshaking protocol as part of the cryptographic session, and wherein the encrypted packet is received without interfering with the handshaking protocol.

70. The method of claim 61, wherein decrypting the packet results in a plaintext packet, and further comprising monitoring the first and second computing devices' cryptographic handshaking information as an authorized third party to ascertain symmetric keys to be used for bulk encryption, whereby the cryptographic session is created, and wherein re-encrypting the packet involves re-encrypting the packet with symmetric bulk encryption keys obtained by passively monitoring a handshake protocol conducted between the first and second computing devices.

71. The method of claim 61, further comprising applying layer 5-7 intrusion detection tools to the decrypted packet.

72. The method of claim 61, wherein non-invasively receiving an encrypted packet involves receiving the encrypted packet in such a way that the reception is undetected by the first or second computing device.

73. An encrypted packet inspection (EPI) method, comprising:
    providing an EPI device configured to maintain a first SSL/TLS session with a first computing device and a second SSL/TLS session with a second computing device;
    non-invasively receiving an encrypted packet from the first computing device during the first SSL/TLS session, the packet being addressed to the second computing device;
    decrypting the encrypted packet with the same set of private keys used by the second computing device, thereby producing a decrypted package;
    inspecting the decrypted packet;
    re-encrypting the decrypted packet; and
    transmitting the re-encrypted packet to the second computing device;
wherein the EPI device maintains a first SSL/TLS session with the first computing device and a second SSL/TLS session with the second computing device, wherein the EPI device receives the encrypted packet from the first computing device during the first SSL/TLS session, and wherein the EPI device transmits the encrypted packet to the second computing device during the second SSL/TLS session.

74. The method of claim 73, wherein the first computing device is a client, and wherein the second computing device is a server.

75. The method of claim 73, wherein the step of decrypting the encrypted packet with the same set of private keys used by the second computing device results in a plaintext packet.

76. The method of claim 73, wherein the step of inspecting the decrypted packet implements a firewall.

77. The method of claim 73, wherein the step of inspecting the decrypted packet implements a load balancer.

78. The method of claim 73, wherein the step of inspecting the decrypted packet implements a local network cache.

79. An encrypted packet inspection (EPI) system comprising:
    an EPI device;
    a system application circuitry;
    a first computing device;
    a second computing device;
    wherein the first and second computing devices are configured to establish a cryptographic session and to send and receive encrypted information over the cryptographic session;
    wherein the cryptographic session passes through the system application circuitry;
    wherein the EPI device is configured to receive communications of the cryptographic session;
    wherein the EPI device is configured to decrypt encrypted communications of the cryptographic session, producing plaintext;
    wherein the EPI device sends the plaintext to the system application circuitry;
    wherein the EPI device and server are both located at an SSL/TLS termination;
    wherein the first and second computing devices engage in a handshaking protocol as part of the cryptographic session; and
    wherein the EPI device does not interfere with the handshaking protocol.

80. The system of claim 79, wherein the EPI device operates within a firewall.

81. The system of claim 79, wherein the EPI device operates within a load balancer.

82. The system of claim 79, wherein the EPI device operates within a local network caching system.

83. The system of claim 79, wherein the cryptographic session includes an SSL/TLS session.

84. The method of claim 79, wherein the first and second computing devices engage in a handshaking protocol as part of the cryptographic session, and wherein the EPI device does not interfere with the handshaking protocol.

85. The method of claim 84, wherein the EPI device and server are both located at an SSL/TLS termination.

* * * * *